United States Patent
Reynolds et al.

(10) Patent No.: US 7,938,049 B2
(45) Date of Patent: May 10, 2011

(54) TRIMMER WITH QUICK ADJUSTMENT FEATURE

(75) Inventors: William Reynolds, Lynchburg, VA (US); Joseph G. Schill, Lynchburg, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 1478 days.

(21) Appl. No.: 11/359,464

(22) Filed: Feb. 23, 2006

(65) Prior Publication Data

US 2007/0193421 A1    Aug. 23, 2007

(51) Int. Cl.
*B23B 3/06* (2006.01)
*B23B 3/00* (2006.01)

(52) U.S. Cl. ............................... 82/56; 82/54

(58) Field of Classification Search ............... 82/54, 56, 82/82, 83, 84, 85
See application file for complete search history.

(56) References Cited

U.S. PATENT DOCUMENTS

| | | | |
|---|---|---|---|
| 3,418,837 A | | 12/1968 | Vanderlaan et al. |
| 3,839,933 A | * | 10/1974 | Paramonoff ...................... 82/61 |
| 3,916,740 A | * | 11/1975 | Stroobants ....................... 82/56 |
| 3,916,746 A | * | 11/1975 | Stroobants ...................... 83/666 |
| 4,181,050 A | | 1/1980 | Stroobants et al. |
| RE30,746 E | * | 9/1981 | Stroobants et al. ............... 82/56 |
| 4,302,958 A | * | 12/1981 | Andriessen et al. .............. 72/71 |
| 5,146,818 A | * | 9/1992 | Hellweg ........................... 82/58 |
| 5,404,776 A | * | 4/1995 | Johansson et al. ................ 82/53 |
| 6,748,835 B2 | * | 6/2004 | Dickey .............................. 82/54 |
| 6,752,052 B2 | * | 6/2004 | Bowlin ........................... 82/1.11 |

FOREIGN PATENT DOCUMENTS

| | | |
|---|---|---|
| WO | WO 88/05700 | 8/1988 |
| WO | WO 97/37786 | 10/1997 |
| WO | WO 98/19807 | 5/1998 |

OTHER PUBLICATIONS

American National Can; Extracts from brochure: 5811/5811-2 Necker Flanger Reformer—Periodic Inspection and Maintenance Procedures; Apr. 22, 1994; 9 pages.
American National Can; Drawings showing commercially available 5811-2 necker machine and Parts List; Oct. 1993; 4 pages.
American National Can; Extracts from brochure: ANC Necker Secrets Revealed; 1996; 3 pages.
American National Can; Invoice to Hanil Can Co., Ltd dated Feb. 2, 1998; 1 page.

* cited by examiner

*Primary Examiner* — Will Fridie, Jr.
(74) *Attorney, Agent, or Firm* — Foley & Lardner LLP

(57) ABSTRACT

An apparatus has a rotatable base having a plurality of guide features with opposed sides and supports. Each of the supports are slidably disposed in one of the plurality of guide features. The supports and the base member have spacer engagement surfaces which are configured to face one another in pairs and to have spacers clamped between each of the pairs. The spacers are so dimensioned as to locate each of the supports in a predetermined position with respect to an axis of rotation of the rotatable base member. A gear train on cut drive side is driven by a variable speed motor. Motor speed can be set for a given can diameter.

20 Claims, 16 Drawing Sheets

TRIMMER WITH QUICK ADJUSTMENT FEATURE

BACKGROUND OF THE INVENTION

1. Field of the Invention

The invention relates generally to machinery such as that used to fabricate cans such as beverage cans and the like, and more specifically to a trimmer arrangement that is used to trim off portions of the cans during their manufacture, and which is quickly adjustable in a manner which reduces the amount of down time during a change in can diameter.

2. Brief Description of the Related Art

A known trimmer arrangement operates by driving a circular knife along the inside wall of the can. In a known can fabrication line, the cans are trimmed using a plurality of trimmer arrangements which are mounted on a rotatable base. An example of such a trimming arrangement can be found in U.S. Pat. No. 4,181,050 issued on Jan. 1, 1980 in the name of Stroobants et al. The content of this patent is hereby incorporated by reference into this application.

In this latter mentioned arrangement, the cans are fed to the trimming arrangement and trimmed while orbiting along a circular path about the axis of rotation of the rotatable base. While this arrangement is efficient in that cans are continuously fed to the continuously rotatable base member and trimmed without interruption as they orbit the axis, a problem is encountered in that for larger cans the radial distance between the can centerline and the knife diameter is greater than with a smaller diameter can. Changes in can diameter therefore require a mechanical adjustment and/or replacement of parts to reposition the trim cartridge/knife diameter relative to the fixed can centerline. The can centerline that includes the cut zone is constant for the full range of can diameters the trimmer is designed to run. The speed of the circular knives which are used also need to be adjusted with the change in can diameter. This can require the replacement of gears in a gear train which supplies rotational energy from a motor or the like.

With the above mentioned trimming arrangement this change over from a set-up suited for one diameter can to a set-up suitable for a can having a different diameter requires a considerable amount of work and an undesirably long downtime.

SUMMARY OF THE INVENTION

This invention is directed to an arrangement which allows a trim cartridge, on which a circular knife or the like type of cutting element arrangement is operatively supported, to be repositioned quickly to a setting which is suited for cutting a can having a different diameter.

This invention is also directed to a trimmer arrangement which is designed to be retrofitted to an existing trimmer station and thus enable that trimmer station to assume a condition wherein the change over from one can diameter to another is greatly facilitated.

More specifically, a first aspect of the present invention resides in an apparatus having: a rotatable base having a plurality of guide features with opposed sides; and a plurality of supports. Each of the supports is slidably disposed in one of the plurality of guide features. The supports and the base member have spacer engagement surfaces which are configured to face one another in pairs and to have spacers clamped between each of the pairs. The spacers are so dimensioned as to locate each of the supports in a predetermined position with respect to an axis of rotation of the rotatable base member.

In one embodiment, an arrangement is provided which forces the supports in a direction which clamps the spacer between the spacer engagement surfaces.

In a further embodiment there is an arrangement for forcing the support laterally toward and into engagement one of the opposed sides of the guide features to eliminate the space that is required to permit sliding movement between the base member and each of the supports.

In a yet another embodiment there is a drive train on each of the supports which interconnects a source of rotational energy with a drive output which is provided on each support and which is configured to provide a drive connection with a device that is mounted on the support, the drive train comprising a plurality of gears which are configured and interconnected in a manner wherein the supports can be moved between a plurality of different positions without need of modification to the gear train.

Yet another embodiment is such that the source of rotational energy comprises a variable speed motor and a gear which is coaxial with an axis about which the rotatable base is rotatable.

A further embodiment is such that cam follower arrangements are each supported on a side of a support which is opposite a side configured to support a device. These cam follower arrangements are configured to cooperate with a cam and to provide a control input to the device in response to engagement with the cam.

In another embodiment the cutting control input comprises moving one cutting element relative to a second cutting element.

A second aspect of the invention resides in a trimmer apparatus which has a base member and a plurality of cartridge mounting arrangements each slidably supported on the base member so as to be each slidable toward a center of the base member. Each cartridge mounting arrangement is adapted to operatively support a trimming cartridge having at least one cutting element. Spacers are disposable between portions of the cartridge mounting arrangements and portions of the base member to determine the position of the cartridge mounting arrangements with respect to the center of the base member. Fastening devices which are associated with each of the cartridge mounting arrangement and which are configured to engage the base member and selectively force the cartridge mounting arrangements toward the center of the base member so as to sandwich the spacers between the portions of the cartridge mounting arrangements and the portions of the base member.

In one embodiment the trimmer apparatus, further has drive train arrangements. Each drive train arrangement is supported on a cartridge mounting arrangement and configured to provide, without modification, a drive connection between a source of rotational energy and a drive connection via which the at least one cutting element of each trimming cartridge is supplied with rotational energy irrespective of the positional adjustment of each of the cartridge mounting arrangements with respect to the center of the base member.

In another embodiment the base member comprises sets of opposed surfaces along which each of the cartridge mounting arrangements slide and which further comprises clamping arrangements each associated with a cartridge mounting arrangement and each of which is configured to force a cartridge mounting arrangement toward a corresponding one of the opposed surfaces so as to eliminate the finite clearance between the cartridge mounting arrangement and the corresponding one of the opposed surfaces which allows the sliding of the cartridge mounting arrangement along the sets of opposed surfaces.

In another embodiment the spacers are so sized and configured to locate the cutting elements on the trimming cartridges in positions predetermined for cutting an article having a predetermined dimension.

In a further embodiment the cutting elements comprise circular knives.

In yet another embodiment the source of rotational energy comprises a motor which is configured to be varied in rotational speed.

In a further embodiment the rotational speed of the motor is varied in accordance with a predetermined dimension of the article.

In a further embodiment the motor is a VFD (variable frequency drive) motor.

In one embodiment the base member is rotatable.

In another embodiment the spacers comprise a plurality of spacer sets wherein each spacer set comprises spacers elements each having essentially identical thicknesses and wherein the thickness of the spacers of each set are different from those of other sets and are selected in accordance with a difference in dimensions of articles to be cut by the cutting elements.

In another embodiment the spacer elements have slotted portions which permit the spacer elements to be slid into positions wherein the fastening devices pass therethrough.

A further aspect of the invention resides in a method of adjusting a trimming cartridge to a position suitable for a trimming a can having a given diameter, comprising: slidably supporting a support, which is configured to support the trimming cartridge, on a rotatable base; disposing spacers between opposed surfaces of the cartridge and the rotatable base to locate the support in a predetermined radial position on the rotatable base; and tightening the support against the rotatable base so that the spacers are clamped between the opposed surfaces.

In addition to the above steps, in one embodiment, it is possible to implement the step of forcing the support in a direction normal to that in which it is slidably supported on the rotatable base to cause it to engage a surface of the rotatable base closely proximate a side surface of the support.

BRIEF DESCRIPTION OF THE DRAWINGS

The various features and advantages of the embodiments of the present invention will become more clearly appreciated as a detailed description of the preferred embodiment is given with reference to the appended drawings in which:

FIGS. 9A and 9B represent the design of one machine arrangement. FIG. 10 represents the design of a second machine arrangement.

DETAILED DESCRIPTION OF THE EXEMPLARY EMBODIMENTS

Figure 1:
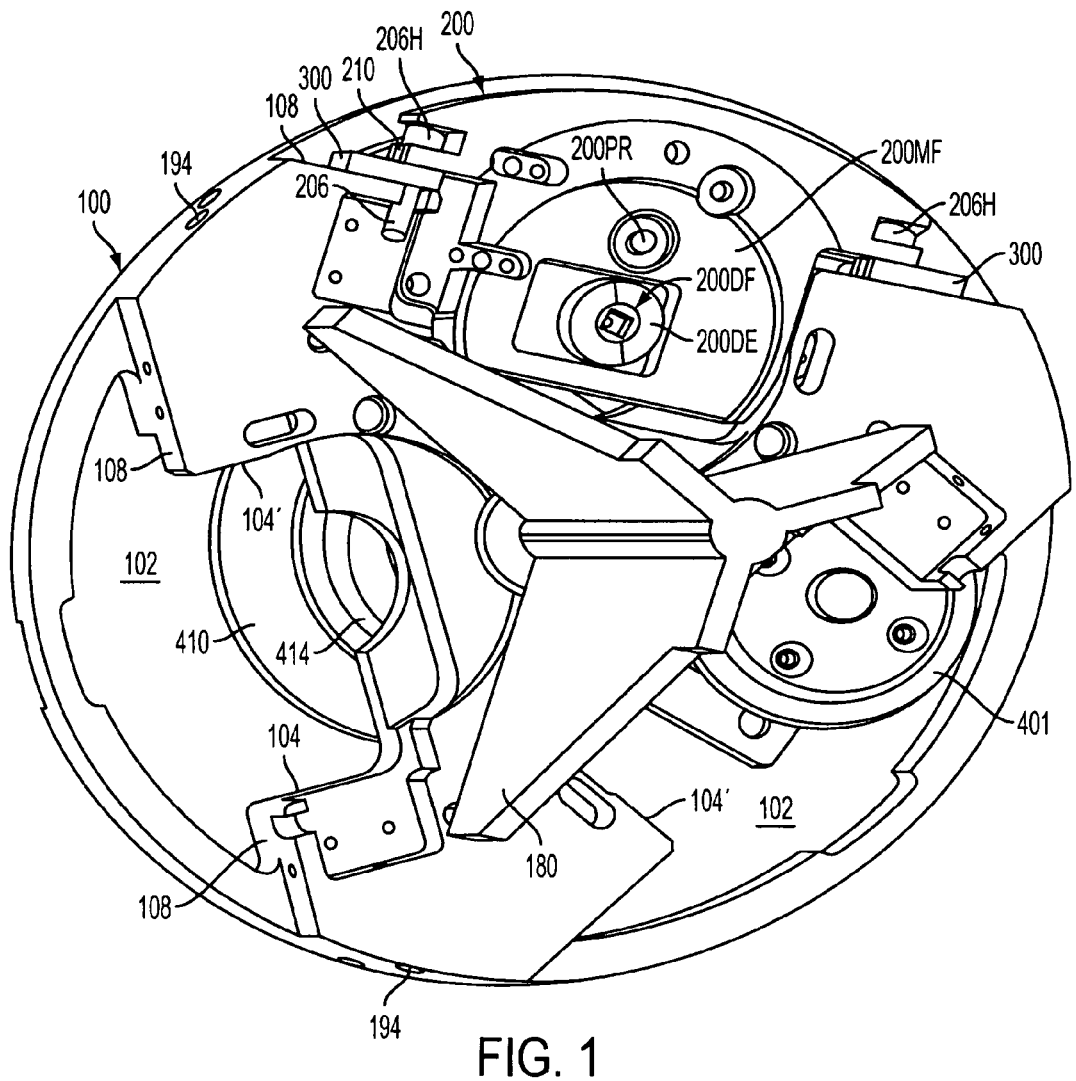
FIG. 1 is a perspective view of part of a trimming arrangement showing the manner in which one of a plurality of trimming cartridge support arrangements is disposed on a rotatable base member in accordance with an embodiment of the present invention.
Figure 12:
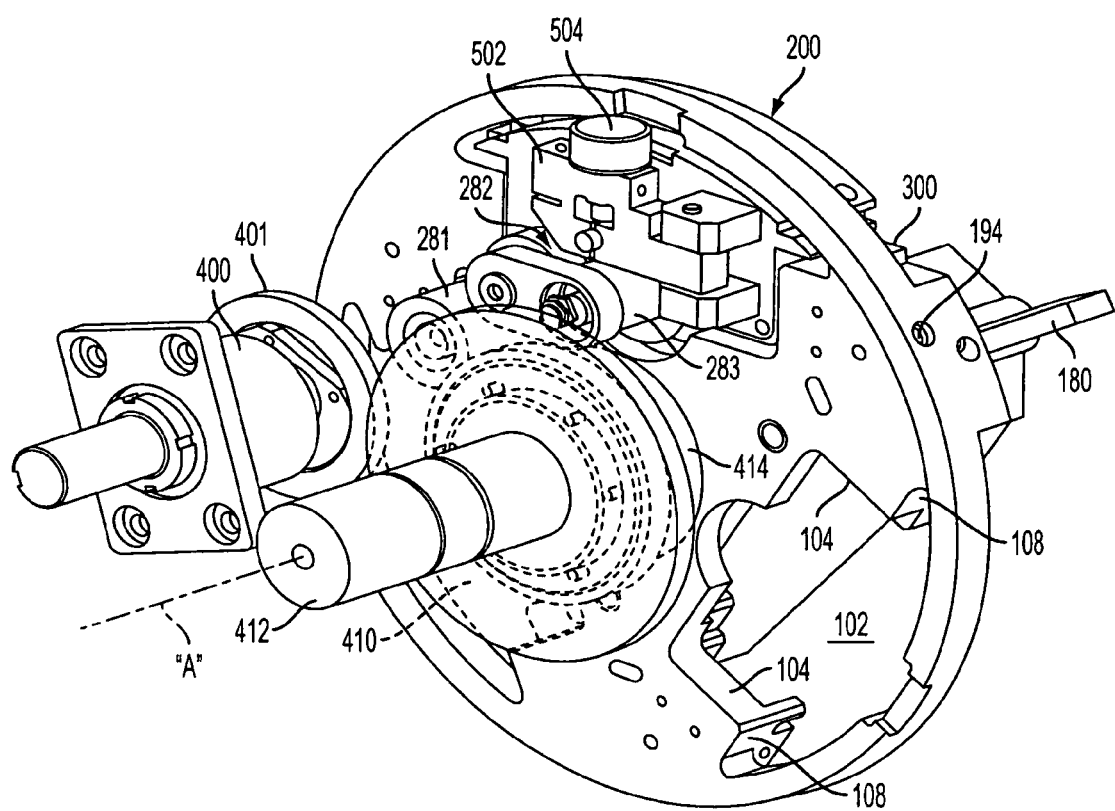
FIG. 12 is a perspective view showing details of a gearing interconnection associated with the embodiment depicted in FIG. 11.

FIG. 1 shows an embodiment of the invention. In this arrangement a rotatable base 100 is formed with three recesses 102 which are each configured to receive a trimming cartridge support 200. In the arrangement illustrated in FIG. 1, only one of the recesses 102 has a cartridge support 200 disposed therein. As will be appreciated, in this embodiment each of the recesses 102 has a substantial portion open to the rear side of the rotatable base. This open portion allows a gear train 280 disposed on the rear face of each support arrangement (see FIG. 3 for example) to be placed in drive connection with a set of gears which, as best seen in FIG. 12, is mounted to the rear of the rotatable base 100 and placed in drive connection with a VHD (variable frequency drive) motor 400 via a set of coaxially mounted gears. This drive train and gear arrangement will be described in more detail herein later.

Figure 7:
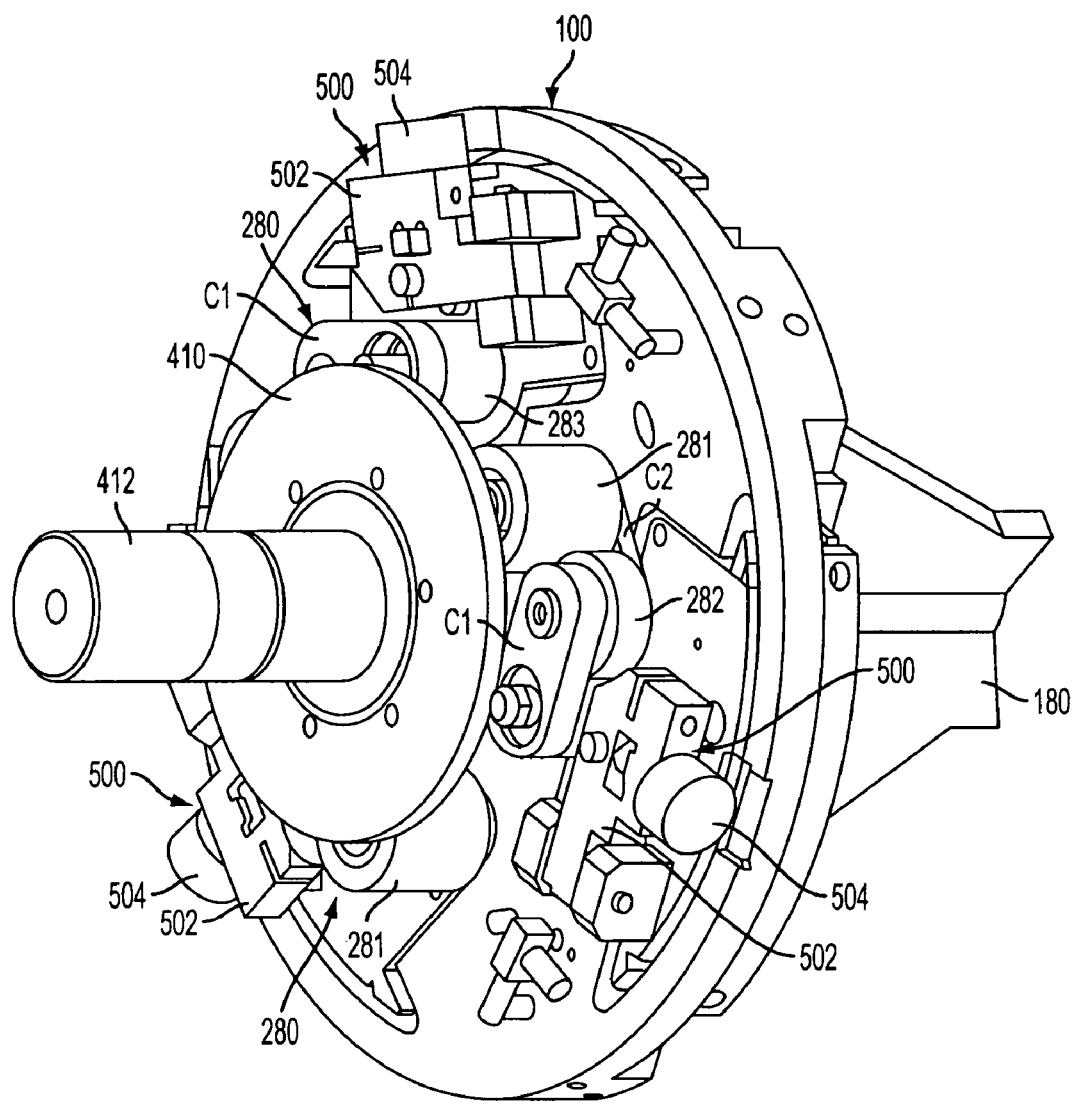
FIGS. 7 and 8 are perspective views of the arrangement shown in FIG. 6.
Figure 8:
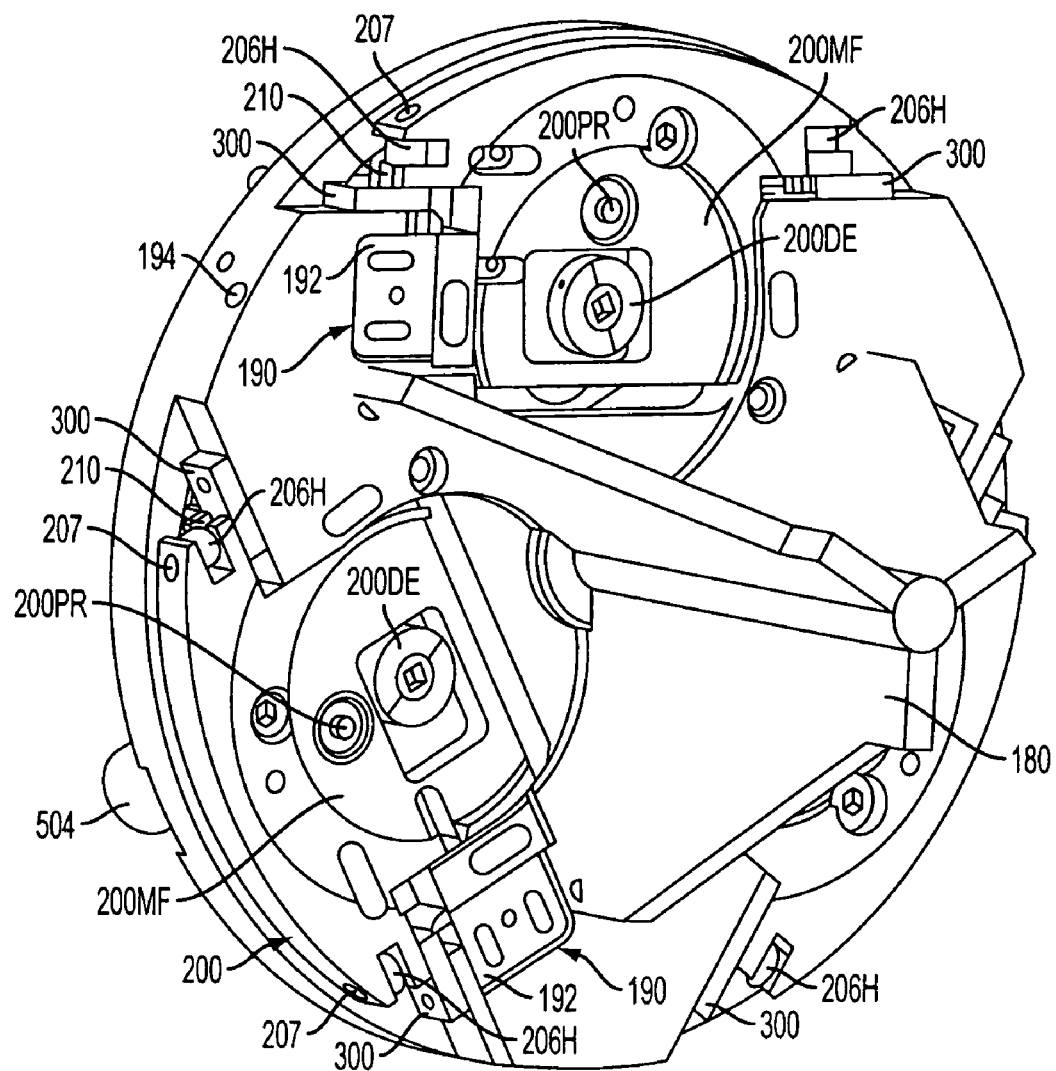

The mainshaft webs 180 are part of shaft 412 (see FIG. 7) and serve to support base 100. This partition 180 is fixedly connected to the rotatable base 100, however the connection allows some adjustment of the base 100 to the shaft 412 for fine tuning the can trimming process.

The illustrated embodiment is arranged to cooperate with three trimming cartridge supports 200. However, the invention is not so limited, and one, two, three, four, five, or more supports could be provided on a single base.

In accordance with this embodiment of the invention, the recesses 102 each have precisely formed parallel guide surfaces 104 that are flat parallel and which cooperate with corresponding surfaces 204 formed on each of the support arrangements 200. The supports 200 are each connected to the base member 100 by way of adjusting bolts 206 which are configured to be threadedly received in the base member 100. These bolts function to draw/force the support 200 toward the center (viz., the axis of rotation) of the base member 100 and the retaining block 190. In this particular instance, the bolts are slid into place via openings 210. The heads of the bolts 206H are enclosed in an alcove-like recess (no numeral) and are accessible through bores 207 which are formed through the body proper of the supports 200. These bores 207 allow hand tools or the like to be guided into the heads of the bolts and thus facilitate quick tightening/loosening as required. The torque with which the bolts are tightened can be set and uniformly applied.

Figure 2:
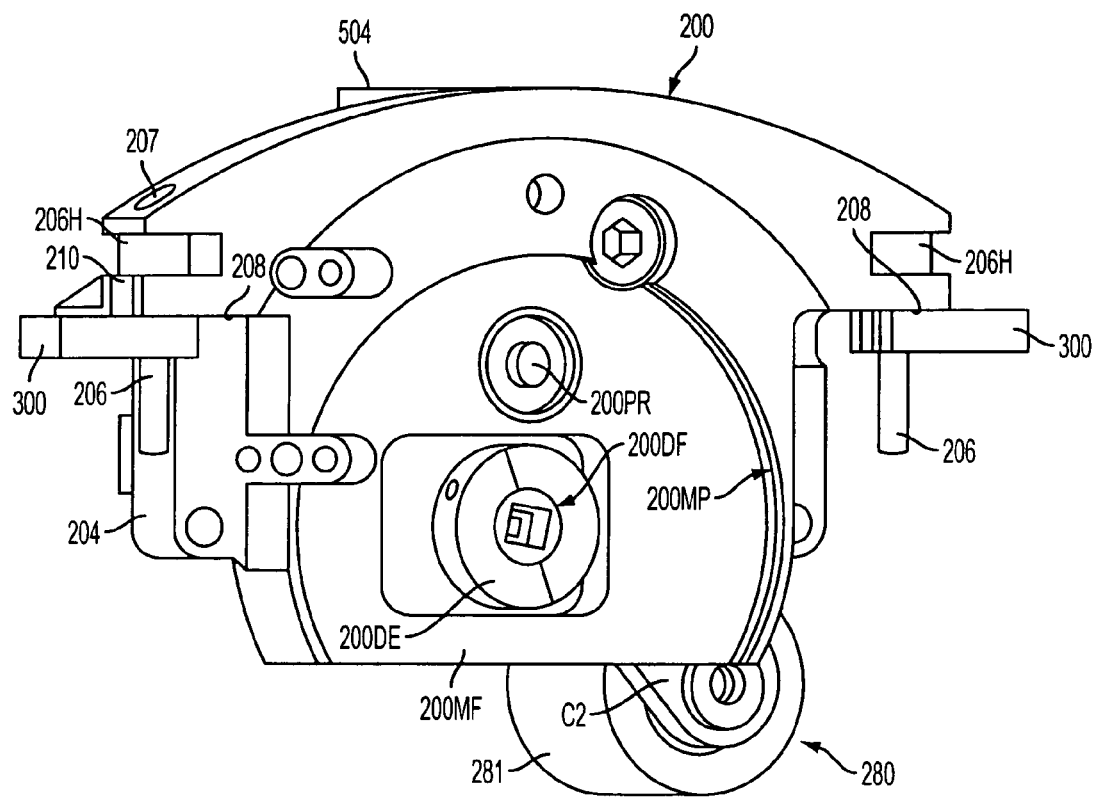
FIG. 2 is a perspective view of front side of the movable cartridge support arrangement which is shown in FIG. 1, showing the disposition of spacer elements which are used for positioning of the carriage support on the rotatable base.

In this particular embodiment of the invention, the base member 100 and the supports 200 are formed with flat, precisely located load bearing surfaces 108, 208 which, in an assembled state, face one another and which are configured to have spacers 300 interposed and clamped there between. These spacers 300, when disposed in the illustrated positions (see FIGS. 1-3 for example), are such as to limit the amount of movement of each the support arrangements 200 toward the axis "A" (see FIG. 12) of rotation of the base member 100 and thus position each of the support arrangements 200 in precisely the same radial position.

By loosening the bolts 206 and changing the spacers 300 for a set which is either thicker or thinner, the radial position of the support arrangements 200 on the base member 100 can be precisely relocated. As will be appreciated, this interchange of spacers 300 allows the radial position of the supports 200, and hence the radial position of the trimming cartridges TC which are mounted thereon, to be quickly adjusted to positions suitable for cans having different diameters.

Figure 4:
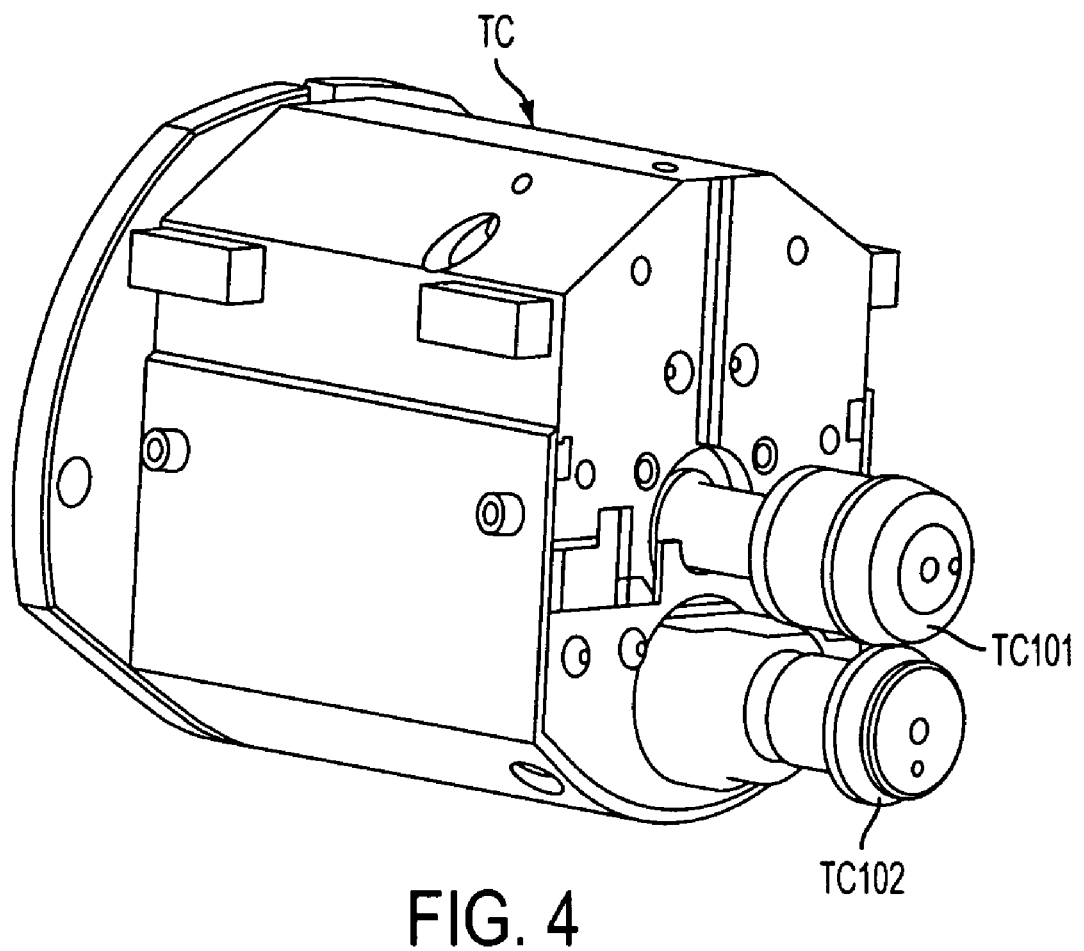
FIGS. 4 and 5 are perspective views of a trim cartridge which is supported and positioned by the cartridge support arrangements shown in FIGS. 1-3.

That is to say, when a change in can diameter occurs it is necessary to also adjust the position of the cutting elements TC101 and TC102 (see FIGS. 4 and 5) which are used to trim the wall of the cans. To achieve this, with this embodiment, all that is basically necessary in connection with the radial position adjustment, is to loosen the bolts 206 on each of the support arrangements, swap out the spacers 300 for another set designed for a different diameter can, and retighten the bolts 206. Inasmuch as the trimming cartridges TC are carried on the supports 200, the relocation of the supports 200 relocates the positions of the cutting elements TC101 and TC102.

A change in diameter will also require a change in the rotational speed of the cutting elements TC101 and TC102 due to the change in the perimeter of the cans. This adjustment will be discussed later.

Of course it is necessary that each of the surfaces 108 on the base member 100 be precisely located with respect to one another. It is also necessary for corresponding care to be exercised with respect to the spatial disposition and arrangement of the surfaces on the mounting site and associated features which permit the cartridge to be operatively connected and supported by the supporting arrangements.

Figure 6:
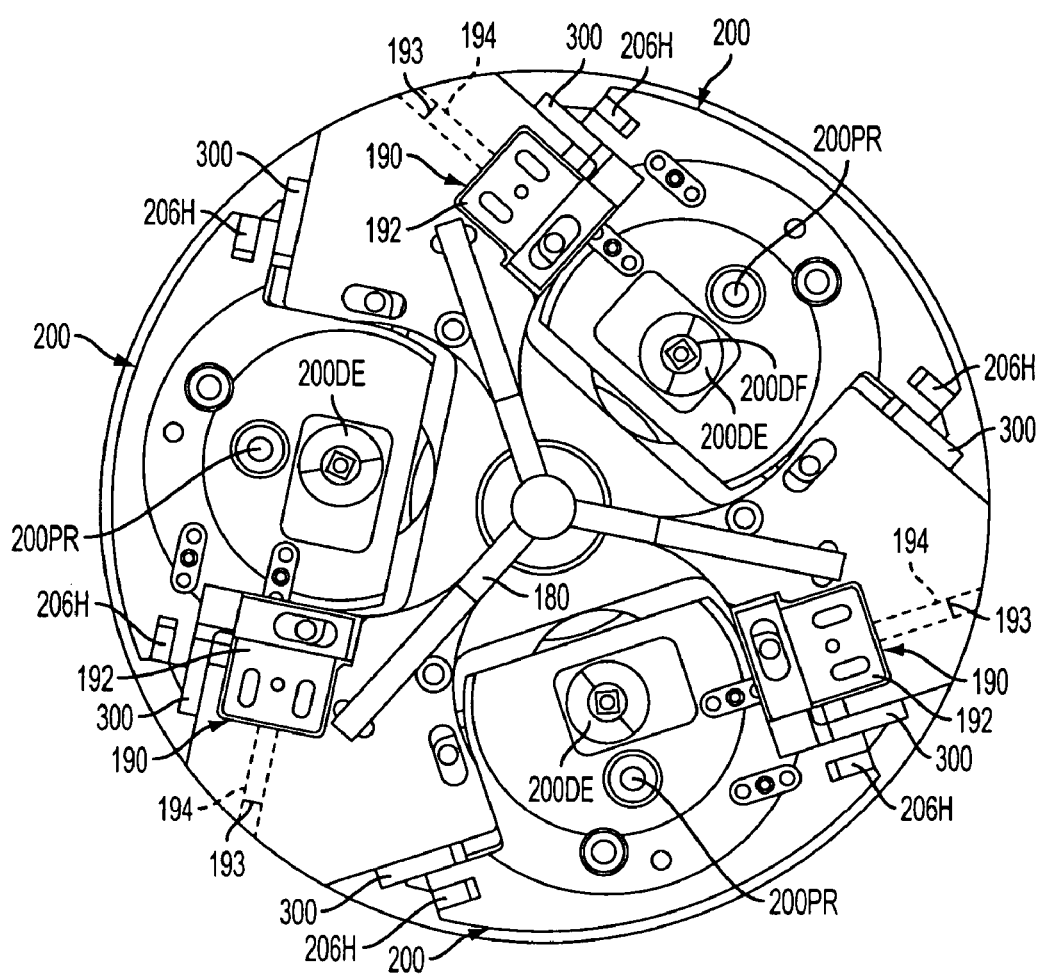
FIG. 6 is a front elevational view of the rotatable base member on which three positionally adjustable cartridge support arrangements are supported and secured in operative positions.

A further feature of this embodiment is associated with the minute but finite clearance which is necessary to allow the sliding of the supports 200 along the guide surfaces 104, but which can be a source of minor positional differences between the supports 200 which leads to a variation in the trimming characteristics. An embodiment of the invention overcomes this by providing a position locking arrangement 190 (see FIG. 6 for example) which drives each of the mounting arrangements 200 laterally against a selected one of the two guide surfaces 104. In this instance, these walls are designated by 104' (see FIG. 1). This lateral displacement eliminates the minute clearance on one side of the supports and thus precisely locates each of the supports in a predetermined relationship with the other supports. This adjustment ensures that the cutting elements TC101, TC102 of the trimmer cartridges TC are all located in the same position with respect to the axis of rotation of the base member 100.

One embodiment of this locking arrangement 190 resides in a lock plate 192 and a setscrew 193 which is disposed in a threaded bore 194 formed in the base member 100. Once each support 200 is located in its appropriate radial position, the lock plate 192 is disposed in position and the bolt 193 is tightened against the lock plate 192 in a manner which drives the plate 192 against one side of the support member 200. This forces the support 200 against the guide surface 104' in a manner wherein the above-mentioned minute but finite clearance which is necessary between the surfaces 104 and 204 to permit the sliding of support 200 with respect to the base member 100, is effectively reduced to zero on one side of the support. With this, each of the support members can, as noted above, be assuredly located in precisely the same position on the base member. This in turn permits the trimming cartridges to be located with the same precision.

Figure 3:
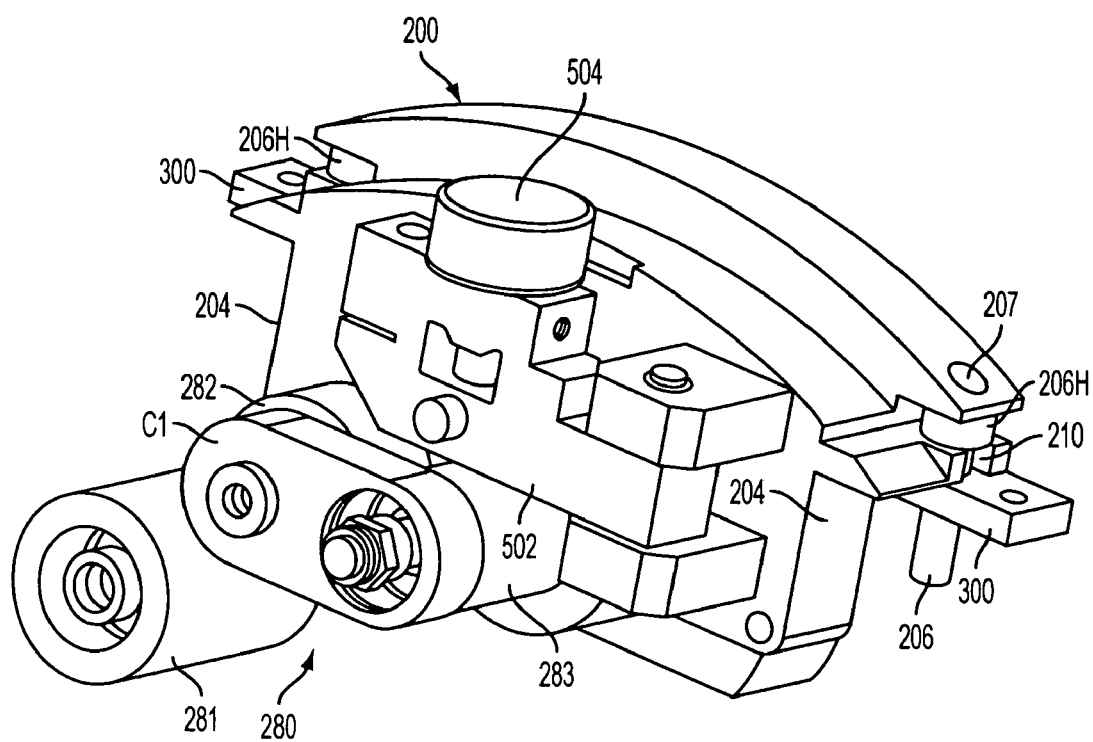
FIG. 3 is a perspective view of a rear side of the movable cartridge support arrangement illustrated in FIG. 1 showing part of a drive train that transmits rotational drive to the cutting elements of the cartridges which is supported on the cartridge support.

As noted above, the drive 280 train which establishes a drive connection between a motor and each of the trimming cartridges TC is mounted on the rear face of each of the supports. An embodiment of this drive train is shown in FIG. 3 and is further depicted in FIGS. 7 and 12.

In one embodiment the above-mentioned VHD motor 400 (see FIGS. 9A, 9B, 10, 11 and 12) has an output gear 401 which is arranged in drive connection with a central or bull gear 410 which is mounted on a shaft 412 which is rotatable about the axis of rotation "A" of the base member 100. A sun gear 414 is mounted on a hub that is positively connected to gear 410. The gear hub assembly rotates relative to the shaft 412. Each of the gear trains 280 comprise a drive pickup gear 281, an idler gear 282, and an input gear 283. These gears are driven by sun gear 414.

It should be noted that each of these elements is schematically illustrated and while resembling rollers are in fact gears with intermeshing teeth which provide a positive drive interconnection with one another.

The rotational speed of the VHD motor 400 is controlled with respect to the perimeter of the cans being trimmed. By varying the speed of the VHD motor 400, the rotational speed of the cutting elements TC1 01 and TC1 02 (see FIGS. 4 and 5) of each of the trimming cartridges TC can controlled to a speed which is suitable for trimming cans having the new diameter.

In the illustrated arrangement, the drive pickup gear 281 and the idler gear 282 are supported on a first carrier half C2 (see FIGS. 3 and 7) so as to be in constant mesh with one another. The idler gear 282 is also supported on a second carrier half C1 which is pivotal about an axis about which the input gear 283 is rotatable. The drive pickup gear 281, the idler gear 282 and the input gear 283 are arranged to be in constant mesh. The first and second carrier halves are rigidly interconnected by a member which extends through the idler gear 282.

This arrangement allows the axis of the input gear 283 to move toward and away from the axis ("A") about which the bull and sun gears 410, 414 are rotatable by an amount corresponding to the adjustment range of the supports 200 while maintaining a constant drive connection between the sun gear 414 and the input gear.

The rotational direction of the gears is such that the intermeshing action between the input gear 283 and the idler gear 282 produces a moment which to rotates the carriers halves C1 and C2 in a manner wherein constant mesh between the drive pickup gear 281 and the sun gear 414 is constantly maintained even after the position of the input gear 283 is moved toward or away from axis "A" in response to radial movement of the carrier 200 on which the gear train 280 is carried. This obviates the need to swap gears in order to accommodate this change in position and thus eliminates a number of operations which prolong downtime of the device.

Figure 5:
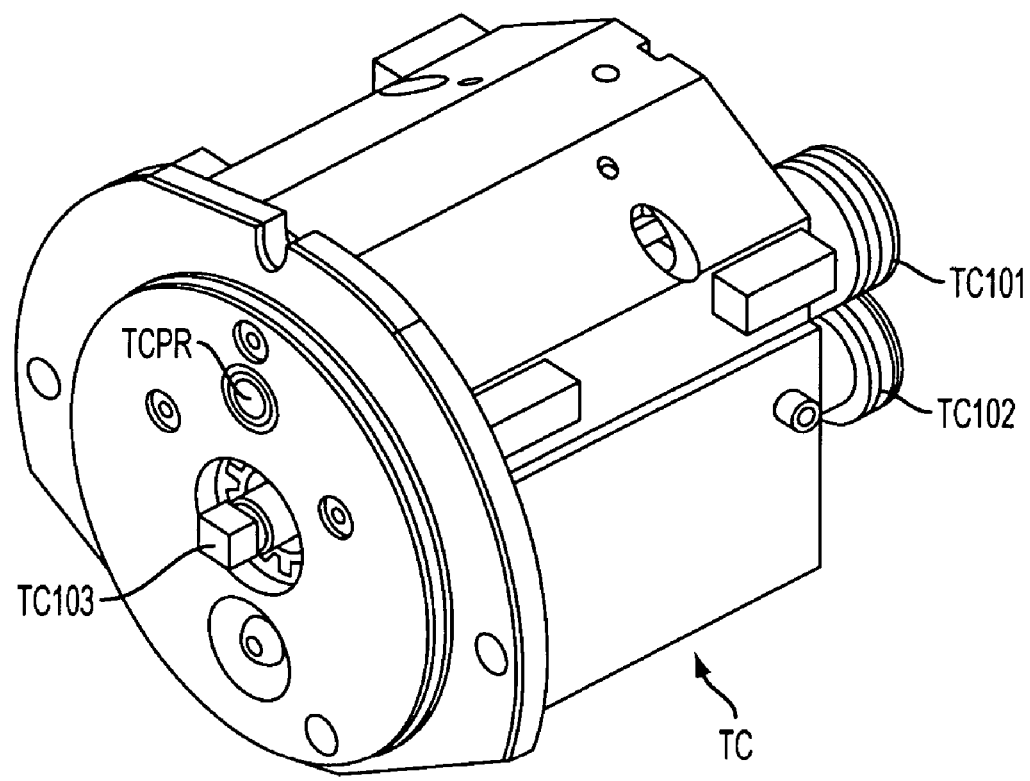

The input gears 283 of each of the gear trains 280 are connected with a drive shaft having a drive connection feature 200DE which is configured to engage with a drive pick up feature TC103 on a trimmer cartridges TC (see FIG. 5). Thus, once the connection face of each trimmer is placed in engagement with a front (connection) face of a support 200, engagement between the drive element and the drive pick up feature occurs and the motor 400 is effectively placed in drive connection with the cutting elements TC101 and TC102. A replaceable insert 200DF is provided and held in place by clamp 200DE. The clamp provides both an anti-rotation feature for the insert to transmit torque to rotate the cartridge shaft TC1 03, and allows easy replacement of the insert if required.

Cam follower arrangements 500 are pivotally mounted on a rear face of each of the supports 200. Each cam follower arrangement 500 comprises a pivotal base plate 502 which engages a push button override 200PR that extends through each support 200 and which is configured to engage a corresponding push rod member TCPR (see FIG. 5) in a trimming cartridge TC when the trimming cartridge TC is mounted in a pilot bore 200MP adjacent to surface 200 MF of a support 200. A circular cam 600 (see FIG. 9B for example), engages rollers 504 which are mounted on each of the pivotal levers 502 and timely induces the pivotal lever 502 to pivot against a bias (which in this embodiment is provided by structure in each of the cartridges TC) and drive the push rod 200PR to reciprocate. This reciprocation controls the movement of the cutting elements TC101, TC102 toward and away from each other.

Construction and operational details of an example of trimming cartridges can be found in the above-mentioned U.S. Pat. No. 4,181,050 to Stroobants et al.

Figure 9A:
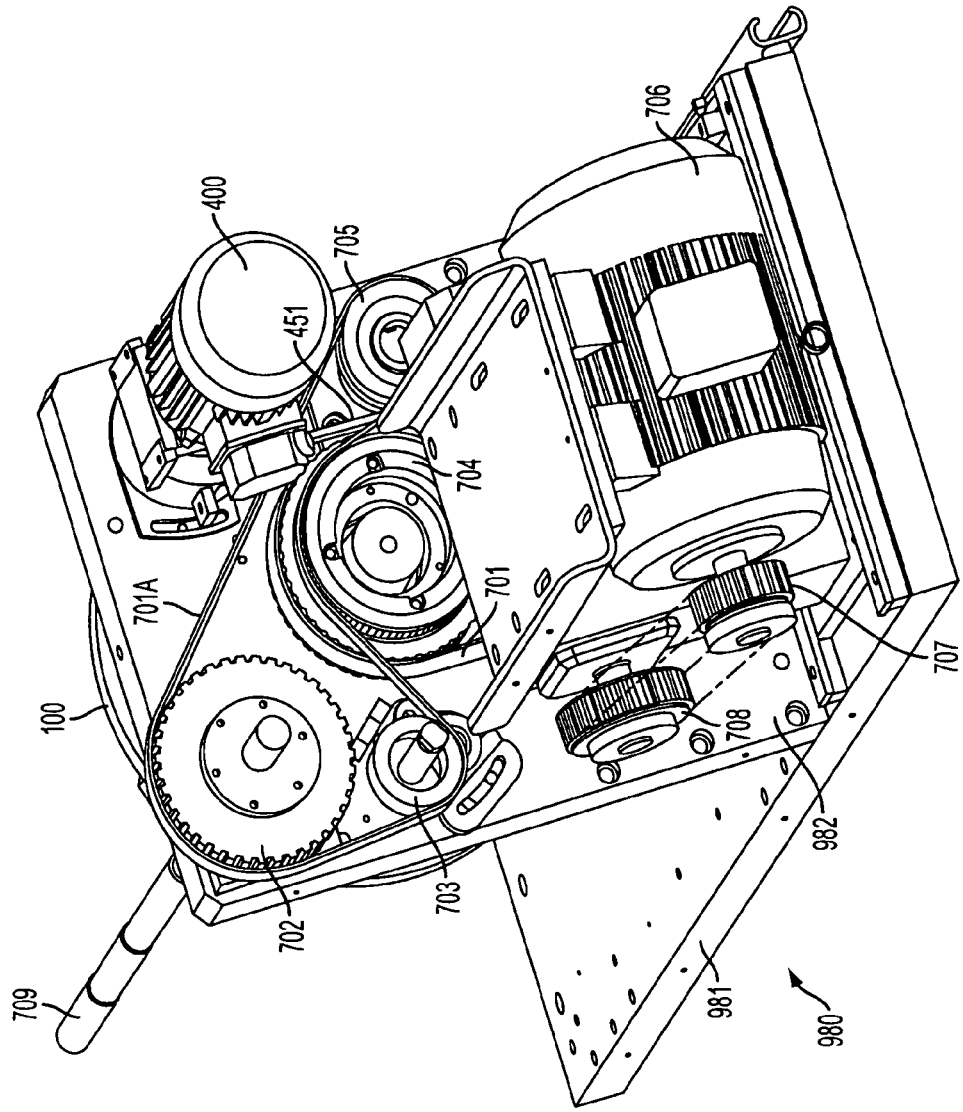
FIGS. 9A, 9B, 9C, and 10 are respectively perspective views showing embodiments wherein motor arrangements are arranged to provide drive via the drive train arrangements depicted in FIG. 3 to the circular knives of the cartridges shown in FIGS. 4 and 5, and also the shaft on which the rotatable base such as shown in FIG. 1, is mounted.
Figure 9B:
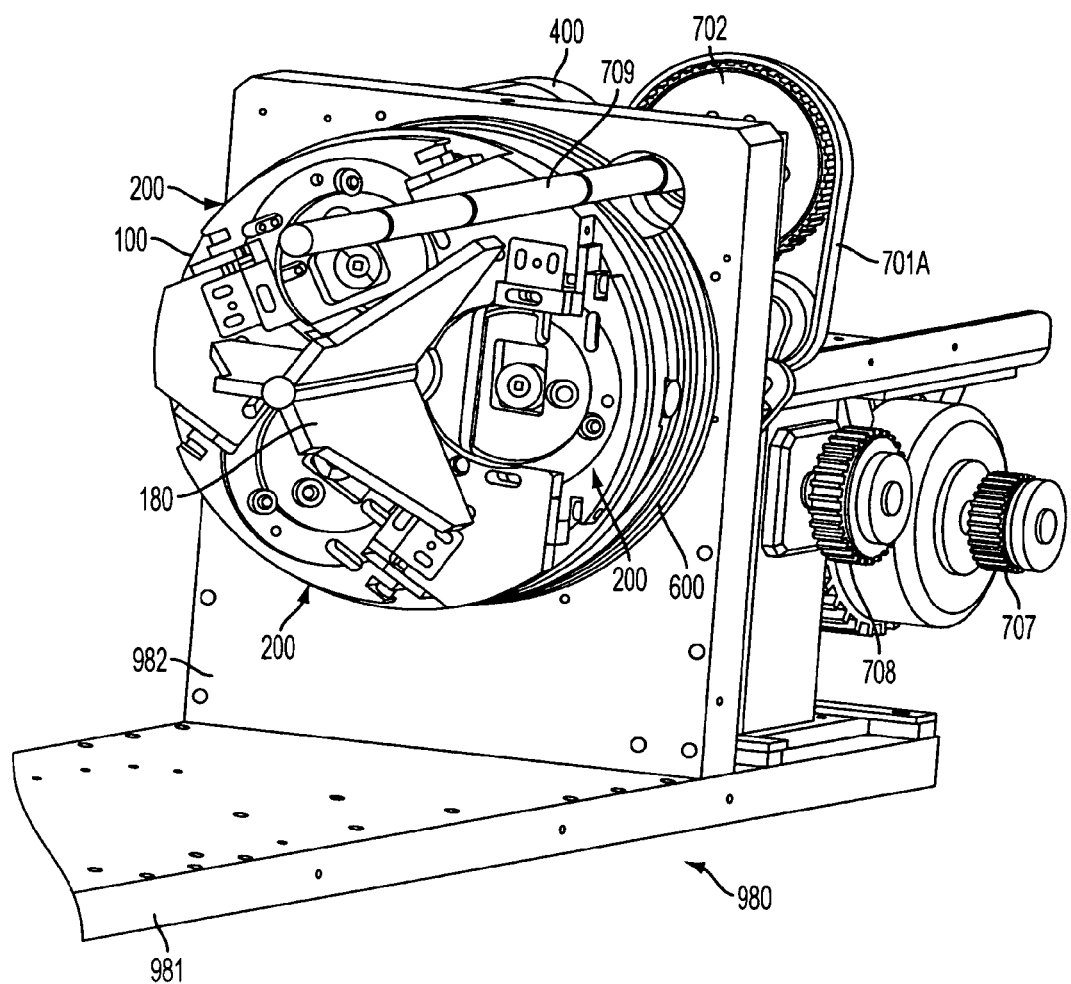
Figure 9C:
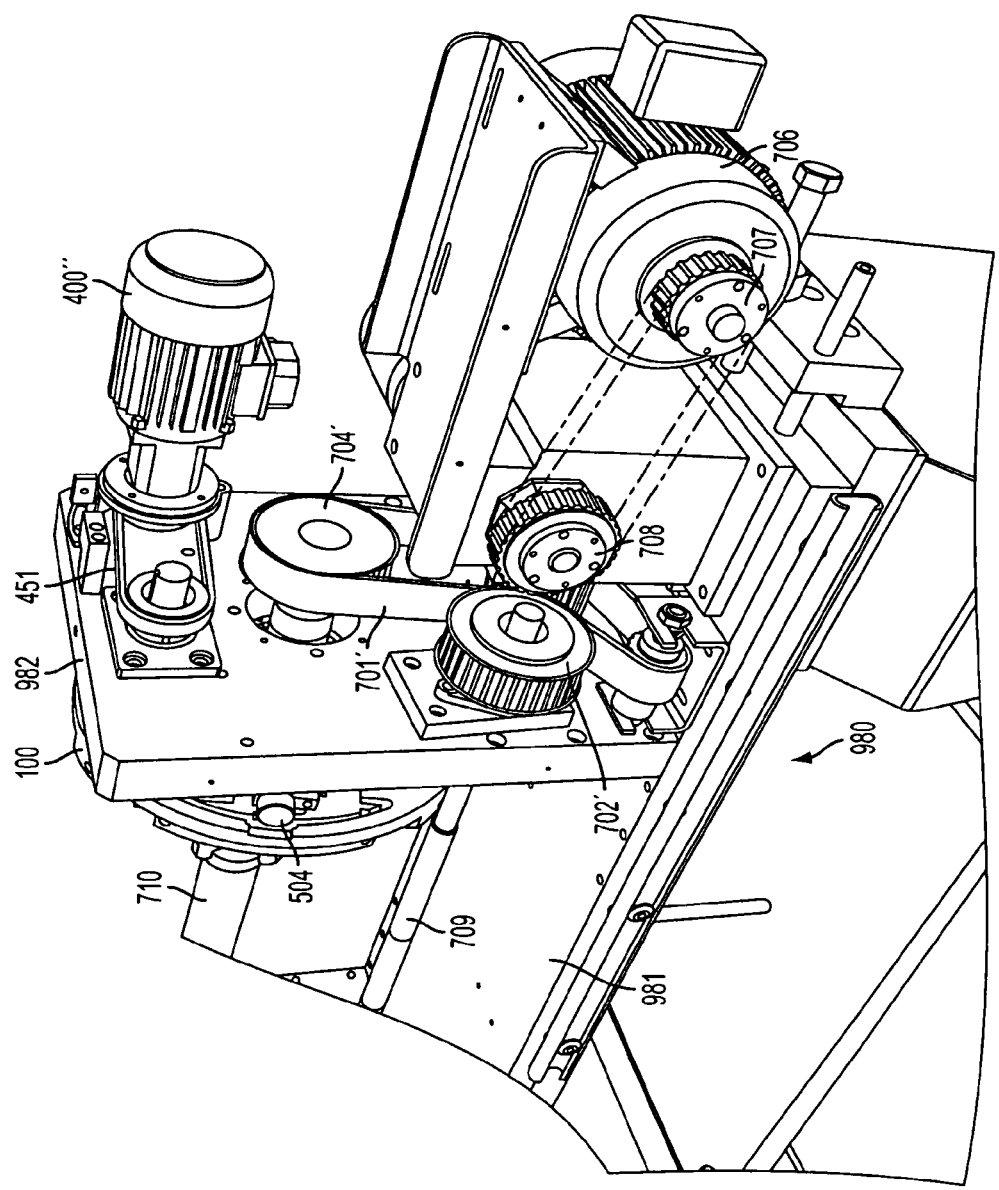
Figure 10:
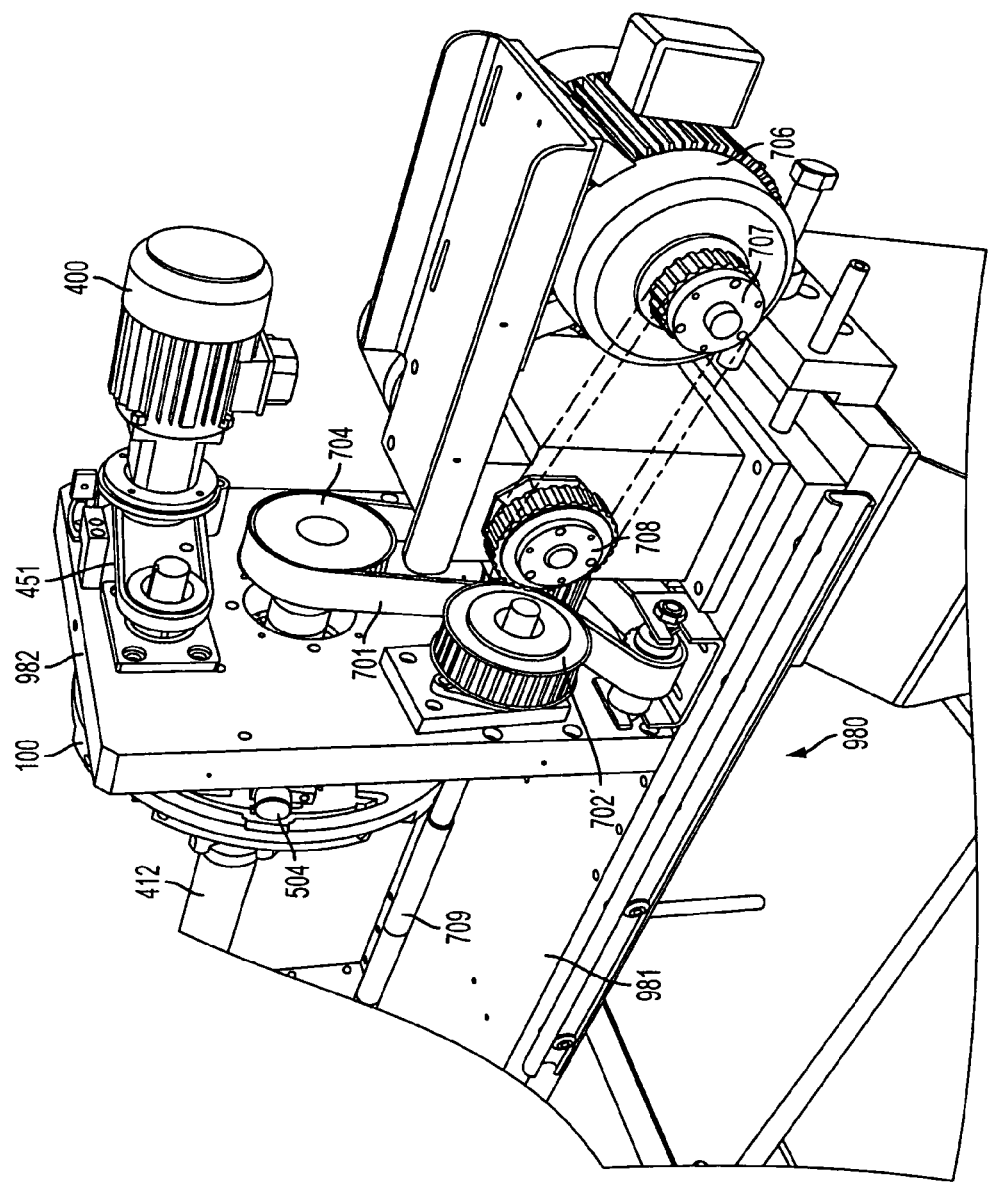
Figure 11:
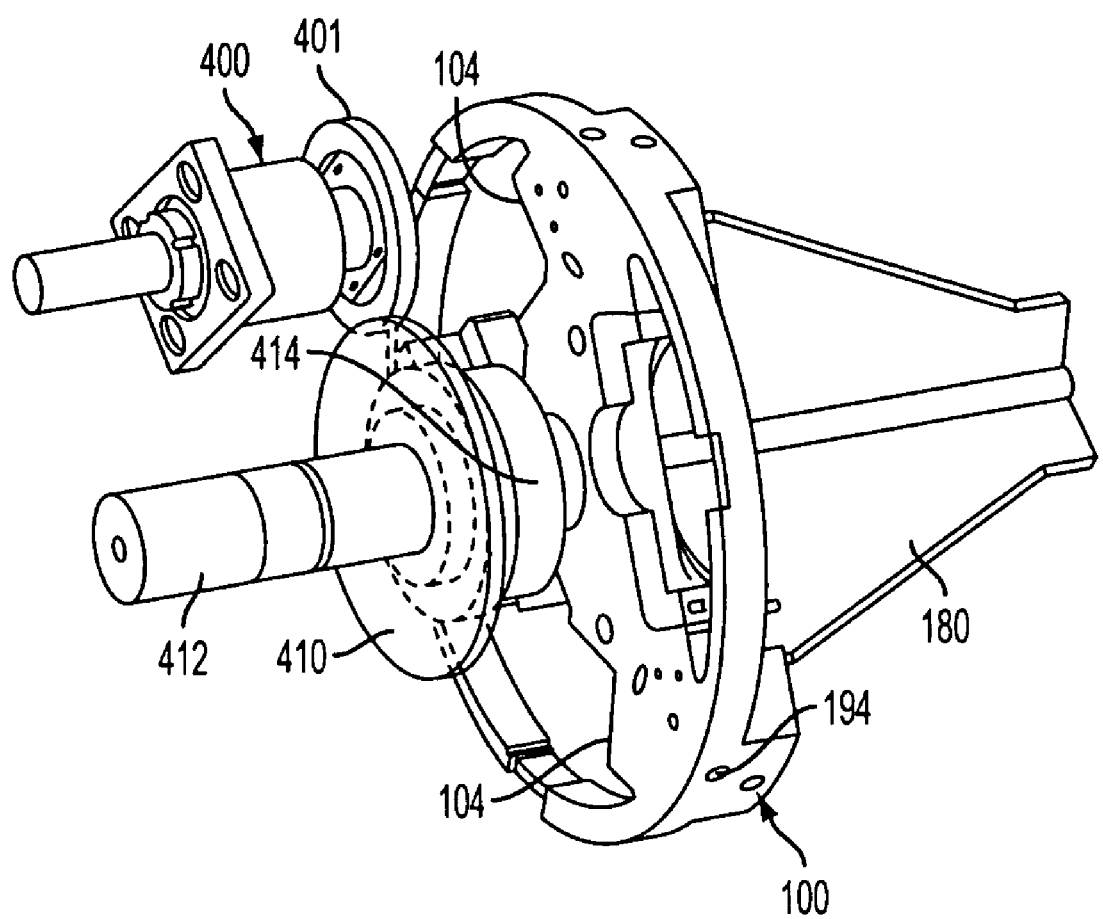
FIG. 11 is a schematic view wherein numerous parts are omitted for clarity, showing one possible disposition of a motor and gear elements which form part of the motor arrangement depicted in FIGS. 9A, 9B and 10 which is associated with the drive train mentioned above in connection with FIG. 3.

FIGS. 9A, 9B and 10 show further embodiments wherein the source of drive for the cutting elements TC101 and TC102 on the trimming cartridges TC, along with that for an auxiliary drive shaft 709 and a main drive shaft 412, is shown. In this embodiment, the rotatable base 100 is mounted on main drive shaft 412 and the main drive shaft 412 is engaged with the main shaft webs 180 so as to complete the main drive shaft arrangement which leads to a can supply arrangement which will be discussed hereinlater.

Figure 13A:
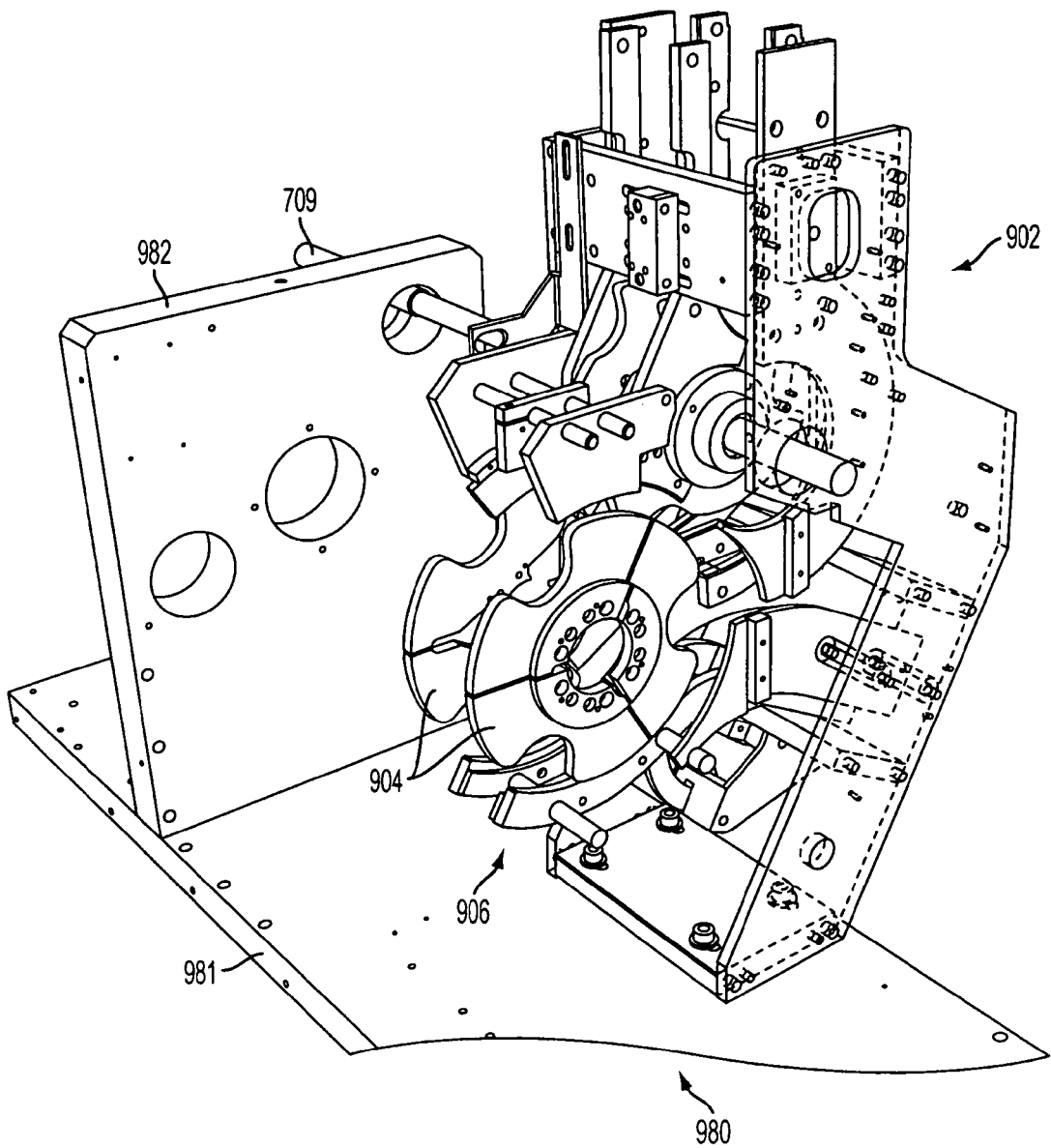
FIGS. 13A and 13B are perspective views showing an embodiment of a can infeed, starwheel and discharge arrangement which operates to bring cans to the trimming arrangement.
Figure 13B:
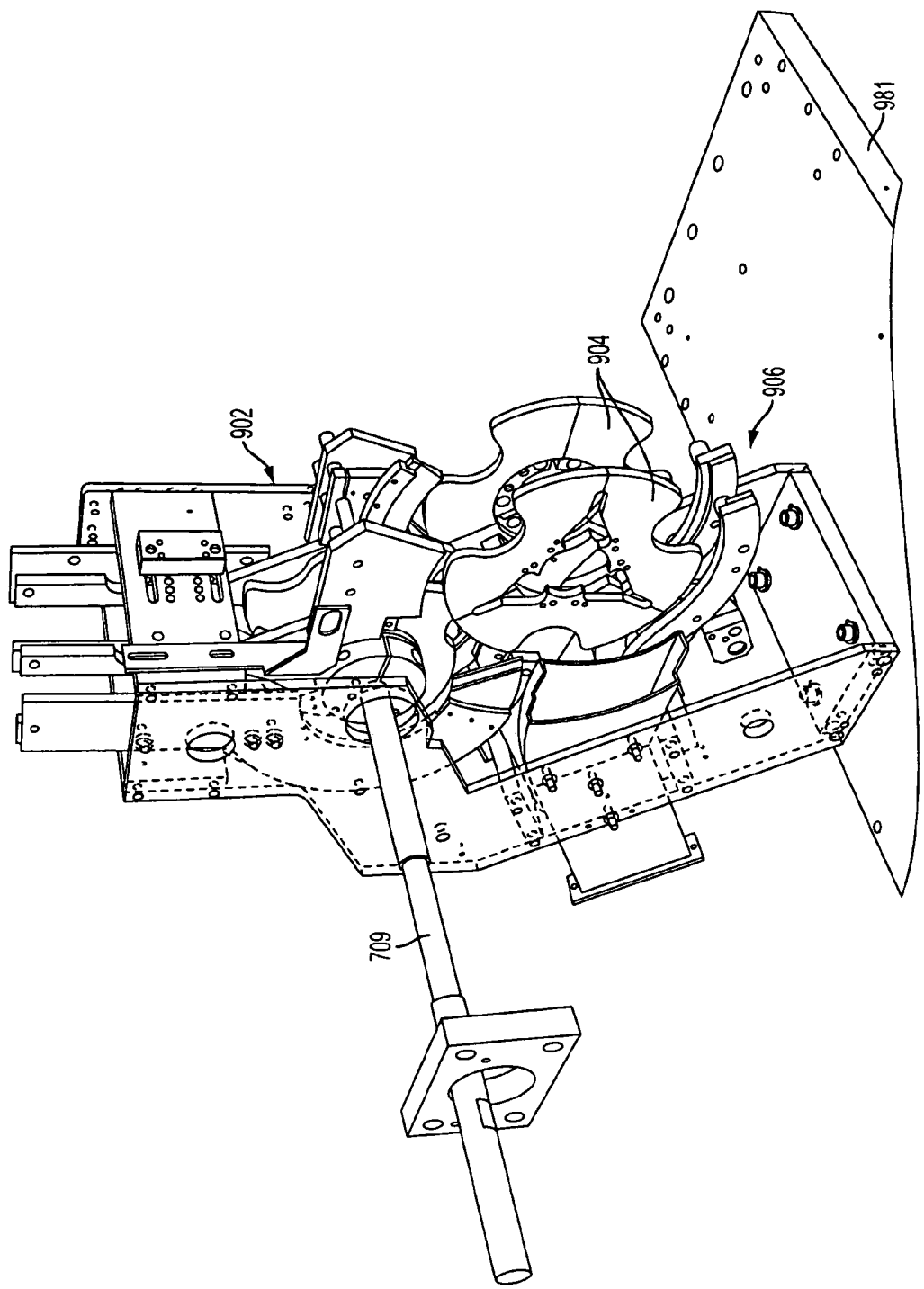

In these embodiments, a belt 701 in FIG. 9A is used in the illustrated manner to interconnect pulleys 704, etc. which are associated with the shaft 412, and a can feed arrangement shown in FIGS. 13A-13B (generally designated by the numeral series 900), that is configured to supply cans from an infeed section 902 to a starwheel 904 which supports the cans in position for trimming by the trimming cartridges TC and subsequently directs the trimmed cans to a discharge chute 906. A serpentine belt 701A in FIG. 9A drives pulleys 702, 703, 705 through 704. Belt 701 in FIG. 10 is used to connect pulleys 702, 704, etc.

Pulley 704 is driven through a non-illustrated drive connection with a gearing and a shaft drive motor 706. This drive motor 706 has an output pulley 707 which is connected with a gearing input pulley 708 via a belt (shown in phantom). It will be understood that this arrangement is merely exemplary of one possible motor/drive train arrangement and that the invention is by no way limited to this particular arrangement/layout.

In the variant which is illustrated in FIG. 10, the belt and pulley arrangement is modified to allow for the auxiliary drive shaft 709 to be located in a position which is lower than in the case of the arrangement depicted in FIG. 9A. It should be noted that the auxiliary drive shaft 709 and the main drive shaft 412 are respectively connected with the can in-feed 902 and starwheel 904 arrangement—see FIGS. 13A and 13B for one embodiment which supplies and holds cans in position suitable for trimming by the trimming cartridges TC. A further example of such an arrangement can be found in the above mentioned reference to Stroobants et al.

The VHD (variable frequency drive) motor 400, in the embodiments shown in FIGS. 9A, 9B and 10, is arranged so that a drive connection between the motor 400 and the associated output gear 401 is also established by way of belts 451 respectively. The fundamental speed control operation of the motor 400 remains unchanged in these embodiments, however the disposition of the motor 400 with respect to other elements/features is rendered more flexible via the provision of the belts which allow the motor 400 to be arranged in positions which are not available with the embodiment depicted in FIGS. 11 and 12, for example. This of course increases design flexibility and ease of adaptation.

In the embodiments illustrated in FIGS. 9A, 9B and 10, the VHD motor 400 and the various pulleys which are used in the different embodiments, are supported on a chassis generally denoted by 980. This chassis 980, in this instance, includes a bed member 981 and a vertical support 982 which supports the VHD motor, pulleys and the rotatable base 100. The can feed arrangement shown in FIGS. 13A and 13B are, although not specifically illustrated as such, mounted on the chassis bed member 981 so as to be located in an appropriate operative position with respect to the trimming cartridges TC that are supported on the rotatable base member 100.

Although the present invention has been described with reference to only a limited number of embodiments, the invention is not so limited and various changes and modifications, which will be self-evident to the those skilled in the art which the present invention pertains or arts most closely related to the present invention, given the preceding disclosure, can be made without departing from the scope of the invention which is limited only by the appended claims.

What is claimed is:

1. An apparatus comprising:
   a rotatable base member having a plurality of guide features with opposed sides;
   supports, each respective support slidably disposed in a different one of the plurality of guide features, the supports and the rotatable base member having spacer engagement surfaces; and
   spacers, each respective spacer configured to be clamped between one of the spacer engagement surfaces and a facing spacer engagement surface,
   wherein each spacer engagement surface on one of the supports or the rotatable base member forms a pair with a facing spacer engagement surface on the other of the supports and the rotatable base member,
   wherein the spacers are dimensioned to position each of the supports in a predetermined position with respect to an axis of rotation of the rotatable base member.

2. An apparatus as set forth in claim 1, further comprising an arrangement which forces the supports in a direction which clamps the spacers between the spacer engagement surfaces.

3. An apparatus as set forth in claim 1, further comprising an arrangement for forcing one of the supports laterally toward and into engagement with one of the sides of the guide features to eliminate space that is required to permit sliding movement between the rotatable base member and the one of the supports.

4. An apparatus as set forth in claim 1, further comprising a drive train on each of the supports which interconnects a source of rotational energy with a drive output which is provided on each support and which is at least in part configured to provide a drive connection with a device that is mounted on each support, the drive train comprising a plurality of gears which are configured and interconnected in a manner wherein the supports can be moved between a plurality of different positions without need of modification to the drive train.

5. An apparatus as set forth in claim 4, wherein the source of rotational energy comprises a variable speed motor and a gear which is coaxial with an axis about which the rotatable base member is rotatable.

6. An apparatus as set forth in claim 1, further comprising cam follower arrangements, each respective cam follower arrangement supported on a side of one of the supports that is opposite a side of the one of the supports configured to support a device, the cam follower arrangements being configured to cooperate with a cam and to provide a control input to the device in response to engagement with the cam.

7. An apparatus as set forth in claim 6, wherein the control input comprises moving a first cutting element relative to a second cutting element.

8. A trimmer apparatus comprising:
a base member;
a plurality of cartridge mounting arrangements each slidably supported on the base member so as to be each slidable toward a center of the base member, each cartridge mounting arrangement being adapted to operatively support a trimming cartridge having at least one cutting element;
spacers which are disposable between portions of the cartridge mounting arrangements and portions of the base member to determine a position of the cartridge mounting arrangements with respect to the center of the base member; and
fastening devices which are associated with each of the cartridge mounting arrangements and which are configured to engage the base member and selectively force the cartridge mounting arrangements toward the center of the base member so as to sandwich the spacers between the portions of the cartridge mounting arrangements and the portions of the base member.

9. A trimmer apparatus as set forth in claim 8, further comprising:
drive train arrangements, each drive train arrangement being supported on one of the cartridge mounting arrangements and configured to provide, without modification, a drive connection between a source of rotational energy and a drive connection via which the at least one cutting element of each trimming cartridge is supplied with rotational energy irrespective of a positional adjustment of each of the cartridge mounting arrangements with respect to the center of the base member.

10. A trimmer apparatus as set forth in claim 8, wherein the base member comprises sets of opposed surfaces along which each of the cartridge mounting arrangements slide and which further comprises clamping arrangements each associated with one of the cartridge mounting arrangement and each of which is configured to force one of the cartridge mounting arrangements toward a corresponding one of the opposed surfaces so as to eliminate a finite clearance between the cartridge mounting arrangement and the corresponding one of the opposed surfaces which allows the sliding of the cartridge mounting arrangement along the sets of opposed surfaces.

11. A trimmer apparatus as set forth in claim 8, wherein the spacers are so sized and configured to locate the at least one cutting element on the trimming cartridges in positions predetermined for cutting an article having a predetermined dimension.

12. A trimmer apparatus as set forth in claim 8, wherein the at least one cutting element comprises circular knives.

13. A trimmer apparatus as set forth in claim 8, wherein the source of rotational energy comprises a motor which is configured to be varied in rotational speed.

14. A trimmer apparatus as set forth in claim 13, wherein the rotational speed of the motor is varied in accordance with a predetermined dimension of the article.

15. A trimmer apparatus as set forth in claim 13, wherein the motor is a VFD (variable frequency drive) motor.

16. A trimmer apparatus as set forth in claim 8, wherein the base member is rotatable.

17. A trimmer apparatus as set forth in claim 8, wherein the spacers comprise a plurality of spacer sets wherein each spacer set comprises spacer elements each having substantially identical thicknesses and wherein the thickness of the spacers of each spacer set are different from those of other spacer sets and are selected in accordance with a difference in dimensions of articles to be cut by the cutting elements.

18. A trimmer apparatus as set forth in claim 17, wherein the spacer elements have slotted portions which permit the spacer elements to be slid into positions wherein the fastening devices pass therethrough.

19. A method of adjusting a trimming cartridge to a position suitable for a trimming a can having a given diameter, comprising:
slidably supporting a support, which is configured to support the trimming cartridge, on a rotatable base;
disposing spacers between opposed surfaces of the trimming cartridge and the rotatable base to locate the support in a predetermined radial position on the rotatable base; and
tightening the support against the rotatable base so that the spacers are clamped between the opposed surfaces.

20. A method as set forth in claim 19, further comprising:
forcing the support in a direction normal to that in which it is slidably supported on the rotatable base to cause it to engage a surface of the rotatable base closely proximate a side surface of the support.

* * * * *